June 13, 1950 L. L. CLAASSEN 2,511,463
FINES DISTRIBUTOR

Filed Sept. 22, 1948 4 Sheets-Sheet 4

INVENTOR.
LAWRENCE L. CLAASSEN
BY
ATTORNEY

Patented June 13, 1950

2,511,463

UNITED STATES PATENT OFFICE 2,511,463

FINES DISTRIBUTOR

Lawrence L. Claassen, Webster Groves, Mo., assignor to Socony-Vacuum Oil Company, Incorporated, a corporation of New York Application September 22, 1948, Serial No. 50,513

3 Claims. (Cl. 23—288)

This invention pertains to systems wherein fluid reactants are contacted with moving beds of particle-form solid contact materials. It is particularly concerned with a cyclic system for conversion of fluid hydrocarbons in the presence of a substantially compact moving column.

Typical of such conversion processes is one wherein a particle-form adsorbent catalyst is moved cyclically through a conversion zone wherein it moves as a substantially compact column while being contacted with vaporized hydrocarbons for the purpose of converting them to lower boiling hydrocarbons such as gasoline and then through a regeneration zone wherein it moves as a substantially compact column while being contacted with a combustion supporting gas such as air to burn off from the catalyst carbonaceous contaminants deposited thereon in said conversion zone. This invention relates specifically to a method and apparatus for achieving uniform size distribution of contact material particles in the moving columns of solids in such systems. It is particularly concerned with a moving bed of solids supplied from a source above and to one side of the center of the bed.

In such catalytic moving-bed type systems the catalyst may partake of the nature of natural or treated clays, synthetic associations of silica, alumina or silica and alumina or inert carriers bearing deposits of certain metallic oxides and the like. The invention is not considered to be limited to catalytic conversion systems but is intended to cover thermal conversion systems and heat exchange systems and the like wherein a substantially inert particle-form solid material moves cyclically through two or more zones in at least some of which it flows by gravity as a substantially compact column. In such systems the contact material may take the form of particles of refractory material, or even of metal. In any event, the normal condition of the contact material as used commercially includes particles of varying sizes within a predetermined size range. For example, in the catalytic cracking of hydrocarbon oils the catalyst particles may desirably fall within the range of about 4 to 20 mesh. A small amount of fines formed by attrition of the normal sized particles will also be present.

In such systems wherein the contact material made up of particles of varying size is moved cyclically through two or more zones there is a pronounced tendency for the particles in the moving stream in certain parts of the system to classify according to size. For example, when the contact material is conveyed in elevator buckets between reaction zones the fines tend to settle towards the bottom of the buckets. Similarly when the contact material passes from an elevator discharge to a surge hopper or to the reaction zone through a downwardly sloping chute, the smaller sized particles tend to settle to the bottom of the stream flowing in the chute. And a further segregation occurs when the material is passed onto the top of the bed in that the fines tend to concentrate in the center of the bed.

This tendency for classification of particles of different sizes results in serious difficulties in such moving bed reaction systems. When the classified stream is fed on the top of the column in a reaction zone, the larger particles are found on one side of the column and the smaller particles on the other side thereof, or localized veins of concentrated fines may occur through the column. Flow characteristics of a fluid medium passing through the column of contact material in the reaction zone will differ between the two sides of the column due to the classification of the granules. As a result non-uniform conversion of the hydrocarbon reactants is obtained and non-uniform coke deposits occur on the catalyst. In the regenerator the same difficulty arises and uneven regeneration of the catalyst results.

A major object of this invention is the provision, in a system wherein contact material of varying particle sizes is contacted as a substantially compact moving column with fluid reactants of a method and apparatus for supplying contact material to said column across its entire horizontal cross-sectional area uniformly both with respect to size of particles and amount.

Another object of this invention is the provision in a cyclic moving column type hydrocarbon conversion system wherein granular catalysts pass cyclically through a reactor and regenerator of a method and apparatus for supply of contact material particles of all sizes present substantially uniformly across the entire surface of each of said columns.

These and other objects of the invention will become apparent from the following discussion of the invention.

The invention may be most easily understood by reference to the drawings attached hereto of which, Figure 1 is an elevational view showing the general arrangement of a cyclic hydrocarbon conversion system of the type to which this invention pertains;

Figure 1:
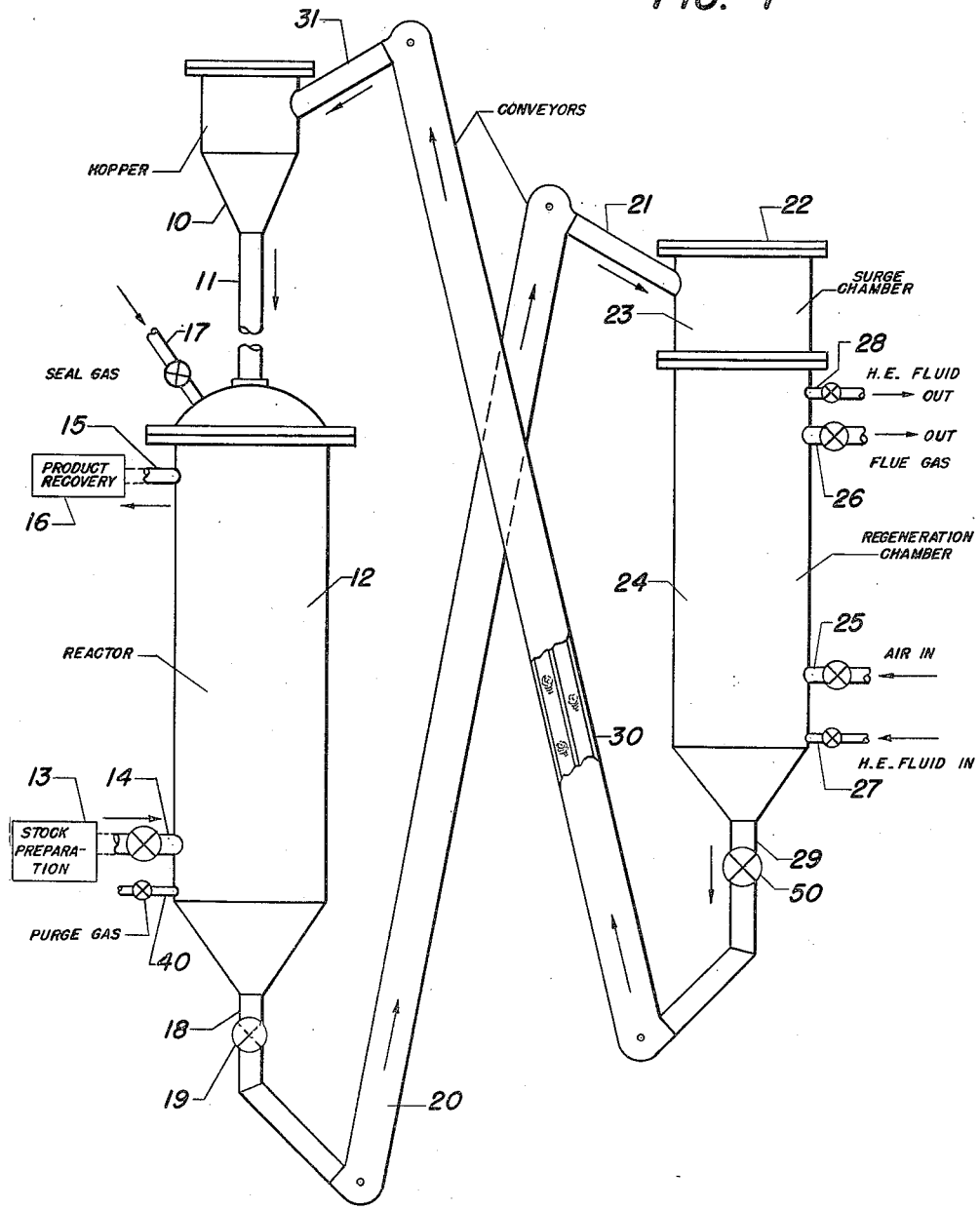
Figure 2:
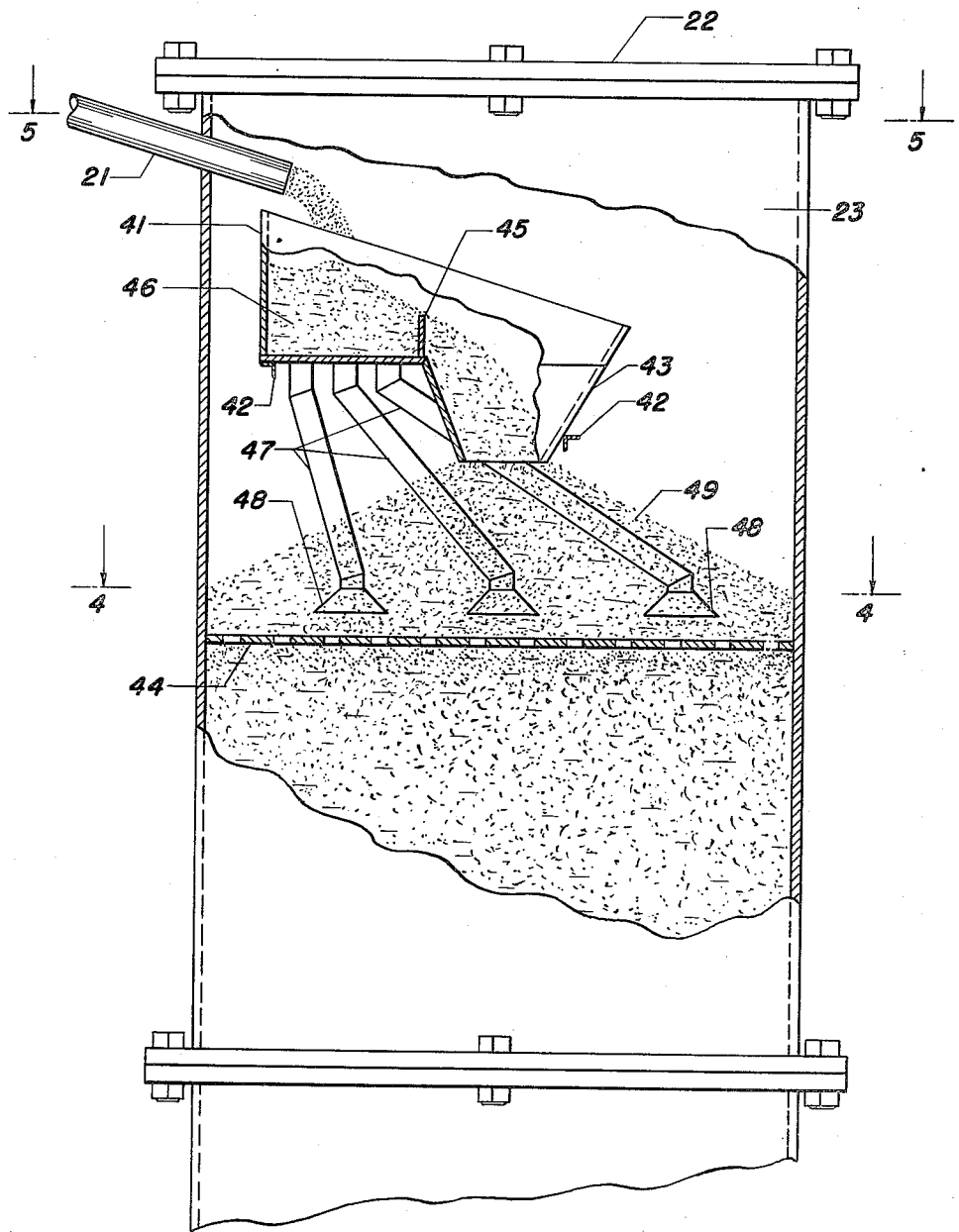
Figure 2 is a vertical view, partially in section, showing in detail the upper section of one of the chambers of Figure 1 and the application of the apparatus of the invention thereto.
Figure 3:
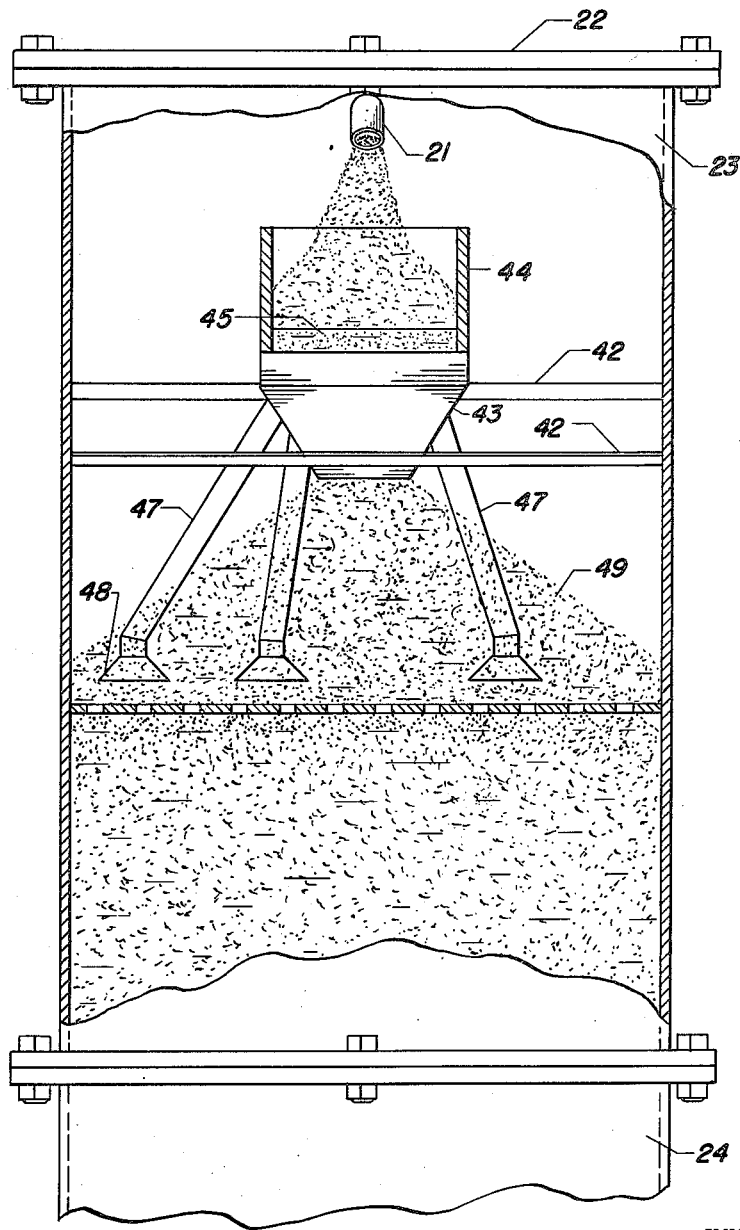
Figure 3 is a vertical view, partially in section, showing in detail the upper section of the chamber shown in Figure 2 as viewed from a position horizontally indexed ninety degrees therefrom.
Figure 4:
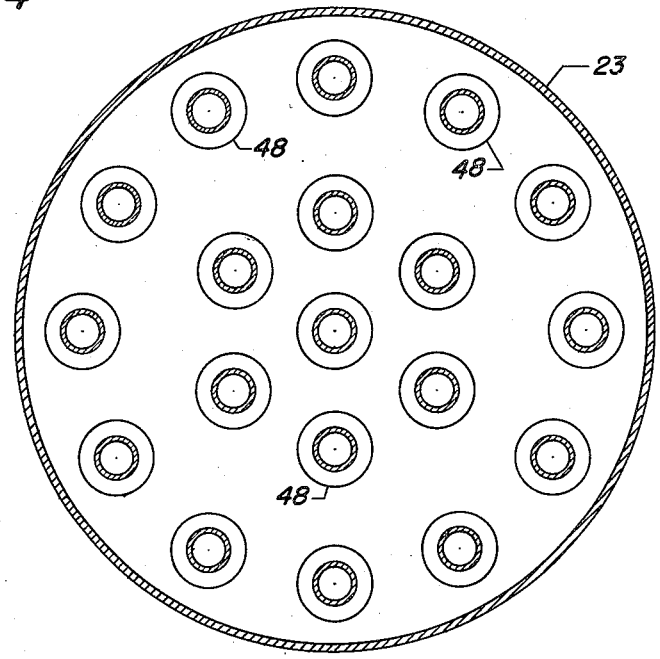
Figure 4 is a sectional plan view taken along line 4—4 of Figure 2.
Figure 5:
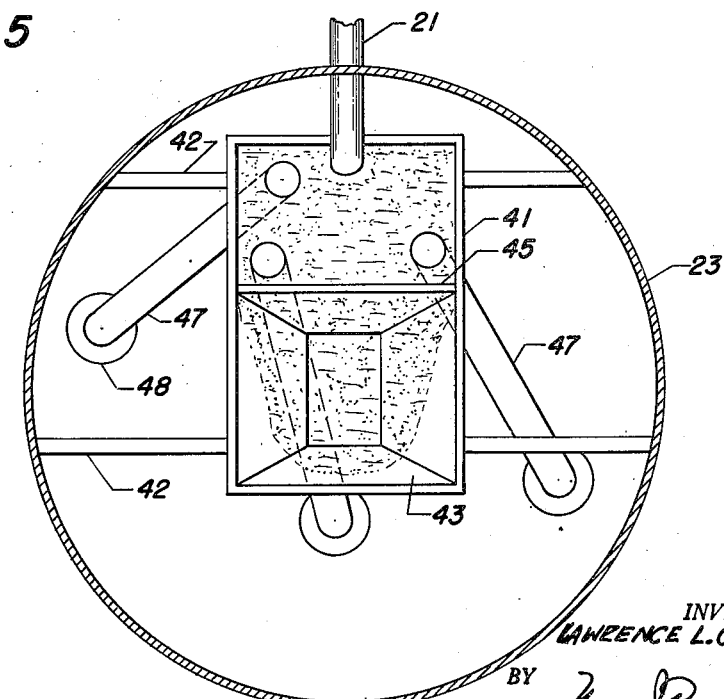
Figure 5 is a sectional plan view taken along line 5—5 of Figure 2. All of these drawings are highly diagrammatic in form.

Referring now to Figure 1 there is shown a cyclic system for catalytic conversion of high boiling hydrocarbons such as gas oil fractions to gasoline and other products. Catalyst in particle form, varying in size, for example 4–20 mesh (Tyler screen analysis) catalyst, passes from a supply hopper 10 downwardly through an elongated gravity feed leg 11 into the upper end of reaction vessel 12. The catalyst moves downwardly through vessel 12 as a substantially compact column while being contacted with hydrocarbon vapors introduced from stock preparation system 13 of conventional type into the lower section of vessel 12 via conduit 14. The gaseous hydrocarbon products pass from the upper section of the vessel 12 through conduit 15 to the product recovery system 16. The escape of hydrocarbons through the feed leg 11 is prevented by maintaining a blanket of an inert seal gas such as steam or flue gas within the upper end of vessel 12. The seal gas is introduced through conduit 17. Spent catalyst bearing a carbonaceous deposit is withdrawn from the lower end of vessel 12, through conduit 18 at a suitable rate controlled by valve 19. The catalyst is purged substantially free of gaseous hydrocarbons before being withdrawn from vessel 12 by means of an inert purge gas such as steam or flue gas introduced at 40. The spent catalyst passes to conveyor 20 by which it is conducted to sloping supply duct 21 which supplies catalyst to the upper section of regenerator vessel 22. Regenerator vessel 22 is comprised of an upper catalyst surge chamber 23 and a communicating lower burning chamber 24. Air is introduced to the burning chamber near its lower end through conduit 25. The air moves upwardly through the column of gravitating catalyst particles in burning chamber 24 so as to burn off the carbonaceous deposit therefrom and is withdrawn near the upper end of chamber 24 through conduit 26. A suitable heat exchange fluid is introduced to heat transfer tubes (not shown) within the chamber 24 via conduit 27. The fluid passes through the heat transfer tubes to remove the excess heat of contaminant combustion from the catalyst and is withdrawn from the tubes via conduit 28. Regenerated catalyst passes from the lower end of chamber 24 via conduit 29 to conveyor 30 by which it is conducted to the downwardly sloping duct 31 supplying hopper 10. The conveyors 20 and 30 may be of any suitable type adapted to transfer particle-form solids at elevated temperatures without excessive attrition of the solid particles. Continuous bucket elevators, for example, have been found to be satisfactory for this purpose. It will be understood that the reactor and regenerator vessels may vary somewhat from the particular construction described hereinabove. For example, the regenerator may be of the multistage type comprised of a vertical series of alternating burning and cooling zones, each burning zone having a separate gas inlet and outlet and each cooling zone having a separate set of heat transfer tubes therein and separate external manifolding associated with said heat transfer tubes.

Referring now to Figures 2, 3, 4 and 5 collectively, there is shown the upper portion of the regeneration vessel 22, particularly the surge chamber 23. Catalyst raised in the elevator is admitted to the surge chamber 23, through the downwardly sloping conduit 21, projected into the side of the surge chamber 23. Catalyst moves from the open end of the conduit 21 into a box-like vessel 41. The vessel 41 is mounted within the surge chamber 23 upon transversely mounted cross-members 42, 42. The box-like vessel is designed to receive the catalyst at one end, and define a passageway, thereby to keep the major portion of the catalyst received moving toward the center of the surge chamber 23. The inner end of the box-like vessel is shaped in the form of a funnel 43, to receive and collect the flowing catalyst, and to deliver said catalyst through its outlet onto a transversely mounted distribution grid 44 located therebelow. A weir 45 is located within the box-like vessel 41 adapted to retain a portion of the moving catalyst within a restricted zone 46, inside the box-like vessel 41. Conduits 47 connecting with this restricted zone 46 conduct the catalyst therefrom in a generally downward direction to spaced discharge points, all located well below the surface of the catalyst bed. Although the discharge points may be located at different levels in the bed, in the preferred embodiment they are all located in one horizontal plane. The catalyst is discharged from the conduits 47 through inverted funnel-shaped exits 48 to commingle with the remaining catalyst in the bed passing around the outside of the exits 48. The catalyst then gravitates through the distribution grid 44, and thereafter passes through the regenerator as previously described.

The purpose and advantages of the above-described apparatus may be most readily understood by a comparison of the operation with and without the apparatus of this invention. In the usual operation the catalyst from the elevator 20 passes through a downwardly sloping conduit 21 directly onto the surface of the column of catalyst 49 in chamber 23. Some classification of fines from coarser particles has occurred in the elevator buckets. In the sloping conduit 21 more classification occurs, the fines settling to the bottom of the stream in the conduit 21 so as to be supplied mostly onto the left side of the column 49 in chamber 23 (i. e. on that side of the column nearest to the conveyor 20). As a result the undersized catalyst particles tend to move downwardly through the regenerator 24 on one side thereof while the larger particles tend to move downwardly through the other side of the regenerator. Consequently, there will be an excessive rate of gas flow through that portion of the column offering the least resistance, namely the portion in which the larger catalyst particles are concentrated. There will also occur too little gas flow in the remaining portions of the vessel horizontal cross-sectional area. Uneven regeneration of the catalyst and localized overheating of the catalyst during its regeneration is the result.

When the method and apparatus of this invention is employed, classification of particles of catalyst of different sizes still occur in elevator 20 and conduit 21, but the stream from conduit 21 is horizontally split into two streams by the weir 45. The material passing over the weir 45 is predominantly coarse particles, which passes through the funnel 43 to be equally distributed throughout the horizontal area of the catalyst bed 49. The material retained by the weir 45 contains the greater proportion of the fine particles. The fines are substantially uniformally distributed throughout the moving catalyst bed by means of the conduits 47 feeding small amounts to a plurality of equally spaced locations in a horizontal plane below the surface of the catalyst bed 49. (In order that the figures remain clear, only a few of the many conduits 47 are shown on the figures to illustrate their general location.) As a result the supply of catalyst of different particle size composition to different portions of the horizontal cross-section of the column 49 is avoided. The surface of the column 49 is maintained at the level of the outlet of the funnel 43 by throttling the catalyst flow from the regenerator by means of valve 50 on drain conduit 29 shown in Figure 1.

A similar catalyst distribution arrangement may be provided in association with supply duct 31 within the reactor supply hopper 10.

It has been found that when particle-form material is delivered into a downwardly moving bed of granular material at a location below the surface of the bed there is a decided tendency of the material passing around the discharge exit to throttle the exit and seriously restrict the flow of material therefrom. The inverted funnel exits 48 attached to the conduit 47 retard the throttling action allowing the particles to drop freely through the conduits 47 at a predetermined rate dependent upon shape and size of conduit and to thereafter enter the downwardly moving bed.

It is clear that within the meaning of this invention several weir walls of different heights may be used to classify the particles into several stream of particles, graded according to size. Each stream may be thereafter split into a plurality of substantially equal streams and the separated streams from each graded stream may be admitted to the bed at different vertical levels below the surface of the bed, the exits from each graded stream being equally distributed throughout the horizontal cross-sectional area of the moving column.

It shall be understood that the details of construction and of application of this invention given hereinabove are intended as exemplary and should not be construed as limiting the scope of this invention except as it is limited in the following claims.

I claim:

1. In combination a vertical vessel adapted for downward movement of a substantially compact bed of particle-form solid therethrough, a source of said solid spaced above said vessel, a supply conduit sloping down from said source to a location within the upper section of said vessel; a trough-shaped member located within said vessel below the outlet of said conduit, a weir wall within said trough-shaped member, means defining an outlet from said trough-shaped member in the form of a funnel located adjacent said weir wall, said outlet means on the side of said weir wall directed away from said supply conduit, a plurality of conduits connected to outlets from the bottom of said trough-shaped member at locations directed toward said supply conduit relative to said weir wall, a plurality of inverted funnels connected to the outlet ends of said conduits at points substantially equally distributed throughout the horizontal cross-sectional area of said vessel.

2. In combination a vertical vessel adapted for downward movement of a substantially compact bed of particle-form material therethrough, a feed conduit connected to the top of said vessel, a storage hopper atop said conduit, a source of particle-form material above and adjacent to said storage hopper, a supply conduit sloping downward from said source to a location within the upper section of said hopper, a box-like member located inside said hopper below the outlet of said supply conduit, one wall of said box-like member adapted to serve as a weir wall, a funnel-shaped exit attached to said weir wall on the side of said wall directed away from said supply conduit, conduits attached to the bottom of said box-like member and connecting therewith, inverted-funnel exits attached to said last named conduits located below said box-like member at substantially equally distributed locations throughout the horizontal cross-sectional area of said hopper.

3. In combination a vertical vessel adapted for downward movement of a substantially compact bed of particle-form solid therethrough, a source of said solid spaced above said vessel, a supply conduit sloping down from said source to a location within the upper section of said vessel, a trough-shaped member located within said vessel below the outlet of said conduit, a weir wall within said trough-shaped member, means defining an outlet from said trough-shaped member in the form of a funnel located adjacent said weir wall, said outlet means on the side of said weir wall directed away from said supply conduit, a plurality of conduits connected to outlets from the bottom of said trough-shaped member at locations directed toward said supply conduit relative to said weir wall, said plurality of conduits terminating at points substantially equally distributed throughout the horizontal cross-sectional area of said vessel.

LAWRENCE L. CLAASSEN.

REFERENCES CITED

The following references are of record in the file of this patent:

UNITED STATES PATENTS

| Number | Name | Date |
|---|---|---|
| 2,434,843 | Fahnestock et al. | Jan. 20, 1943 |
| 2,441,170 | Rose et al. | May 11, 1948 |